(12) United States Patent
Oohashi

(10) Patent No.: US 7,730,985 B2
(45) Date of Patent: Jun. 8, 2010

(54) MOTORCYCLE WITH BATTERY MOUNTING ARRANGEMENT

(75) Inventor: Satoshi Oohashi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 403 days.

(21) Appl. No.: 11/757,585

(22) Filed: Jun. 4, 2007

(65) Prior Publication Data
US 2008/0006463 A1    Jan. 10, 2008

(30) Foreign Application Priority Data
Jun. 5, 2006    (JP) .............................. 2006-156384

(51) Int. Cl.
*B62M 7/00*    (2010.01)
(52) U.S. Cl. ...................... 180/68.5; 180/219
(58) Field of Classification Search ................ 180/68.5, 180/219, 291, 311, 312
See application file for complete search history.

(56) References Cited

U.S. PATENT DOCUMENTS

| | | | | |
|---|---|---|---|---|
| 4,445,585 A | * | 5/1984 | Imani | 180/68.5 |
| 6,073,719 A | * | 6/2000 | Ohmika et al. | 180/219 |
| 6,920,950 B2 | * | 7/2005 | Sonoda | 180/68.3 |
| 7,114,588 B2 | * | 10/2006 | Kudo et al. | 180/219 |
| 7,377,552 B2 | * | 5/2008 | Miyabe | 280/835 |
| 7,523,800 B2 | * | 4/2009 | Shinsho et al. | 180/219 |

FOREIGN PATENT DOCUMENTS

JP    05-085454    6/1993

* cited by examiner

*Primary Examiner*—Glenn Dayoan
*Assistant Examiner*—Bridget Avery
(74) *Attorney, Agent, or Firm*—Keating & Bennett, LLP

(57) ABSTRACT

A motorcycle includes a motorcycle body, which incorporates a frame. An engine is supported by the motorcycle body. The engine includes a cylinder block and a crank case. An exhaust pipe communicates with the engine and has a portion that extends along a side of the engine. A battery is located above an upper surface of the crank case of the engine and to the rear of the cylinder block. The portion exhaust pipe extending along the side of the engine is located to a side of the battery and a heat shield plate is positioned between the exhaust pipe and the battery.

24 Claims, 4 Drawing Sheets

MOTORCYCLE WITH BATTERY MOUNTING ARRANGEMENT

RELATED APPLICATION

This application is related to, and claims priority from, Japanese Patent Application No. 2006-156384, filed Jun. 5, 2006, the entirety of which is incorporated by reference herein and made a part of the present specification.

BACKGROUND OF THE INVENTION

1. Field of the Invention

The present invention relates to a motorcycle in which an engine is mounted to a body of the motorcycle and an exhaust device communicates with the engine. More particularly, the present invention relates to motorcycle with a battery mounting arrangement.

2. Description of the Related Art

In certain competition motorcycles, such as a motorcycle for use in motocross races, for example, a battery is generally not provided in order to reduce vehicle weight. However, when it is desirable to utilize electronic components on such a motorcycle, for example, a fuel injection valve instead of a carburetor, it is necessary to provide a control unit to control fuel injection timing and the like. As a result, a battery is provided as power supply for the control unit. An example of a structure for mounting the battery on a motorcycle is shown in Japanese Publication No. 05-085454. In the motorcycle of Japanese Publication No. 05-085454, the battery is mounted on an upper surface of a crank case and to the rear of the cylinder block.

SUMMARY OF THE INVENTION

However, motorcycles of the type disclosed in Japanese Publication No. 05-085454 often use a structure in which an exhaust pipe extends along one side of an engine. As a result, if the battery is disposed on the upper surface of the crank case and to the rear of the cylinder block, the exhaust pipe of the exhaust device passes in the vicinity of one side of the battery. An aspect of the present invention involves the present inventor's realization that the heat emitted from the exhaust pipe may be sufficient to cause damage to the battery. Thus, the service life of the battery is likely to be reduced.

The present motorcycle with a battery mounting arrangement has been devised in light of the above described circumstances, and provides a motorcycle that has a structure that inhibits a battery from being damaged by heat emitted from an exhaust pipe.

One aspect of the present invention involves a motorcycle including a motorcycle body. The motorcycle body includes a frame that supports an engine of the motorcycle. The engine includes a cylinder block supported by a front section of a crank case. An exhaust pipe communicates with the engine and includes a portion that extends in a rearward direction along one side of the engine. A battery is located above an upper surface of the crank case of the engine and to the rear of the cylinder block. The portion of the exhaust pipe is located to a side of the battery, and a heat shield plate is positioned between the exhaust pipe and the battery.

Advantageously, with a preferred embodiment of the present motorcycle, the heat shield plate is positioned between the battery and the exhaust pipe. As a result, heat from the exhaust pipe is inhibited from being transmitted to the battery, whereby the battery is inhibited from suffering damage caused by heat from the exhaust pipe. Accordingly, the service life of the battery is inhibited from being reduced.

BRIEF DESCRIPTION OF THE DRAWINGS

These and other features, aspects and advantages of the present invention are described below with reference to drawings of preferred embodiments, which are intended to illustrated, but not to limit, the present invention. The drawings contain four (4) figures.

DETAILED DESCRIPTION OF THE PREFERRED EMBODIMENTS

Figure 1:
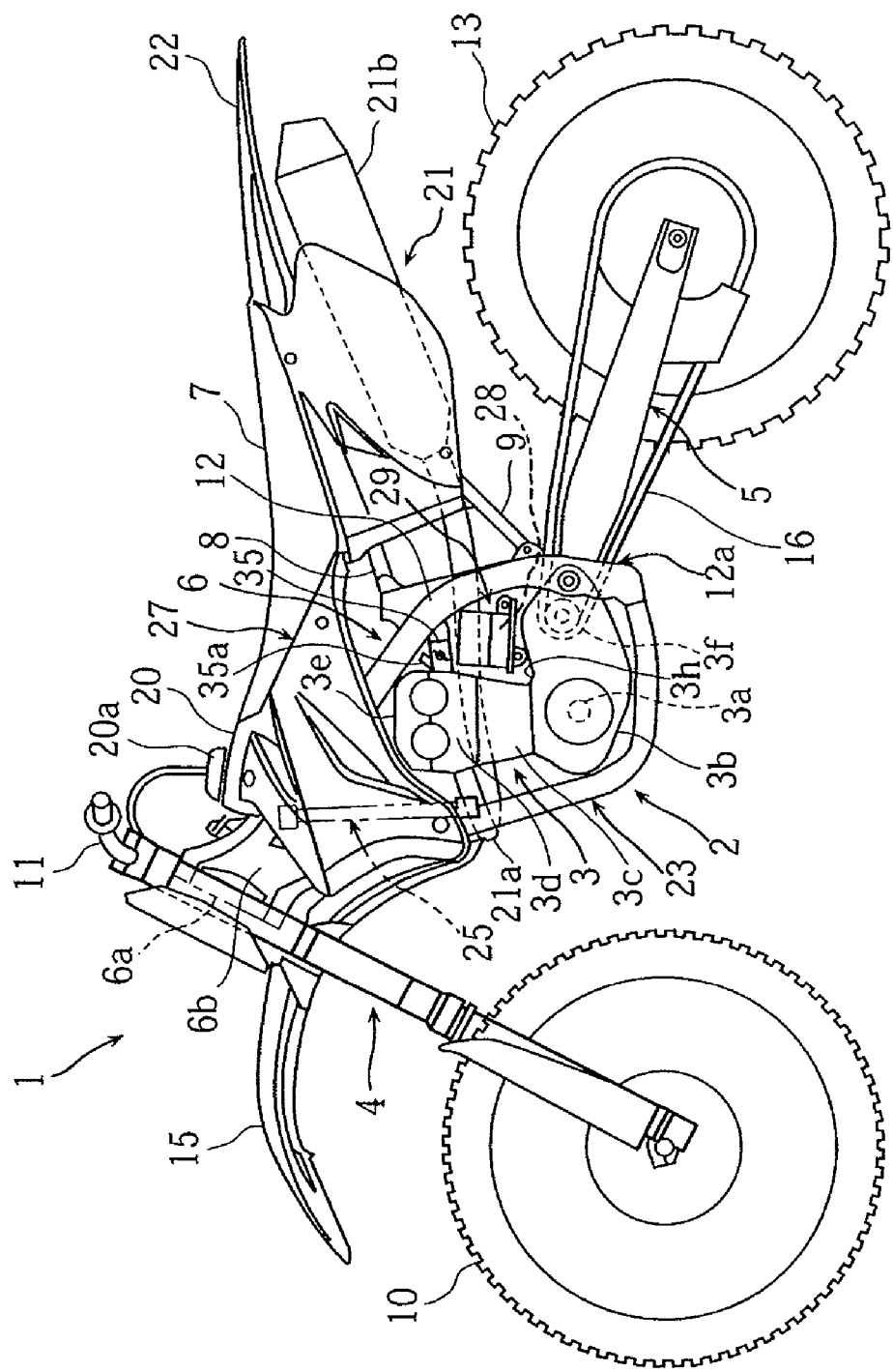
FIG. 1 is a left side view of a motorcycle provided with a battery mounting arrangement having certain features, aspects and advantages of the present invention.
Figure 2:
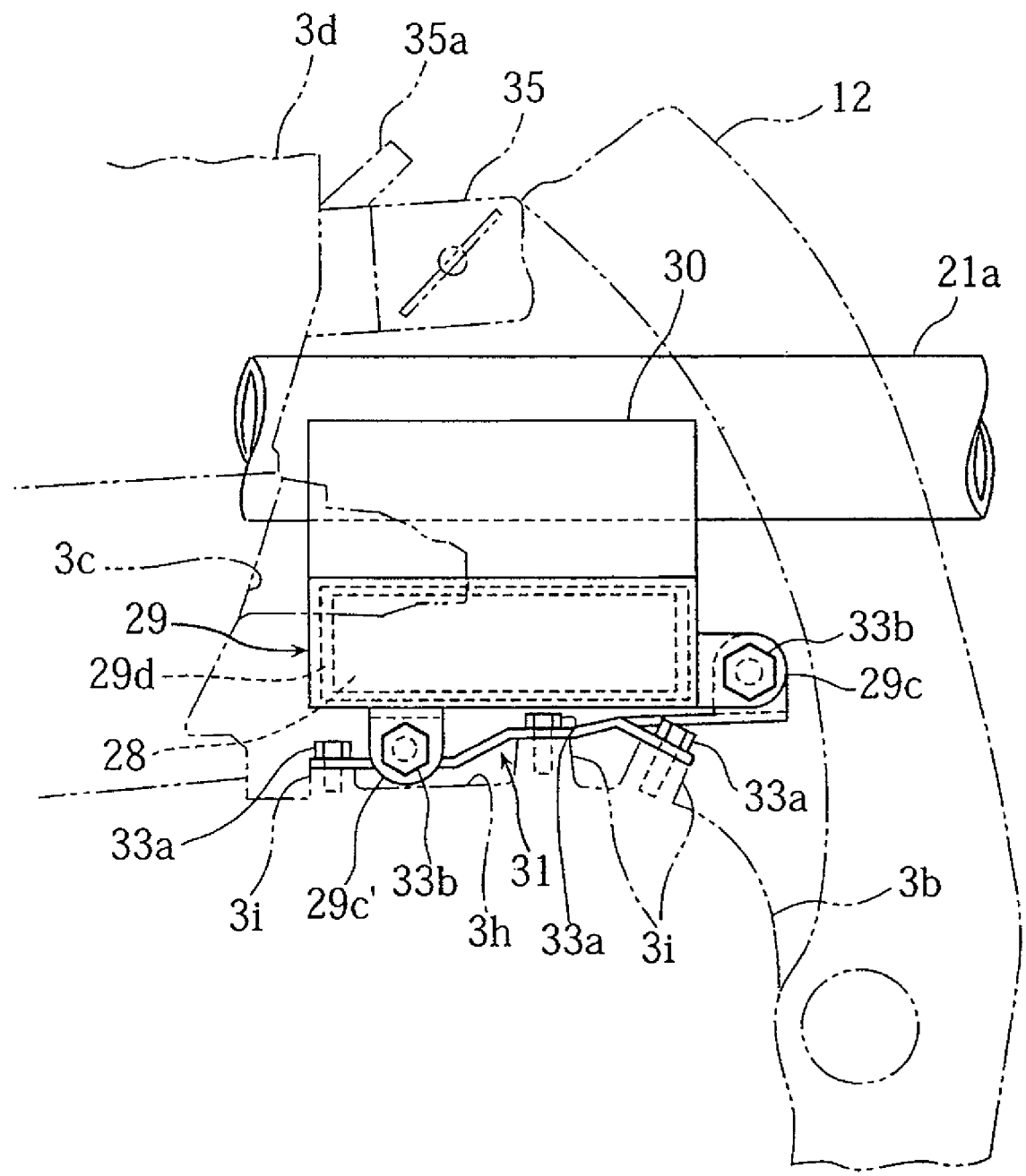
FIG. 2 is left side view that illustrates the battery mounting arrangement of FIG. 1.
Figure 3:
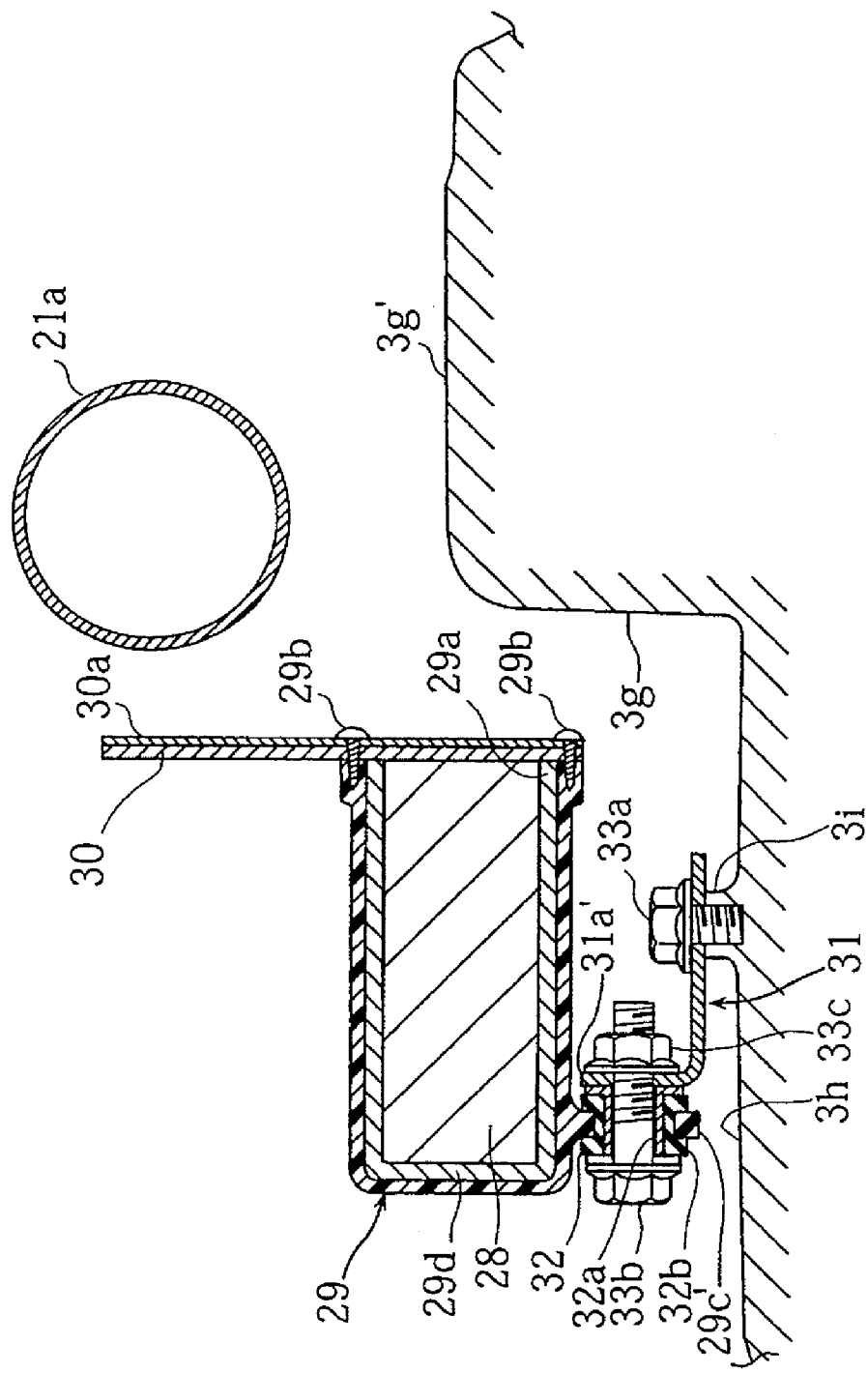
FIG. 3 is a cross sectional view that illustrates the battery mounting arrangement of FIG. 1 taken along the line III-III of FIG. 4.
Figure 4:
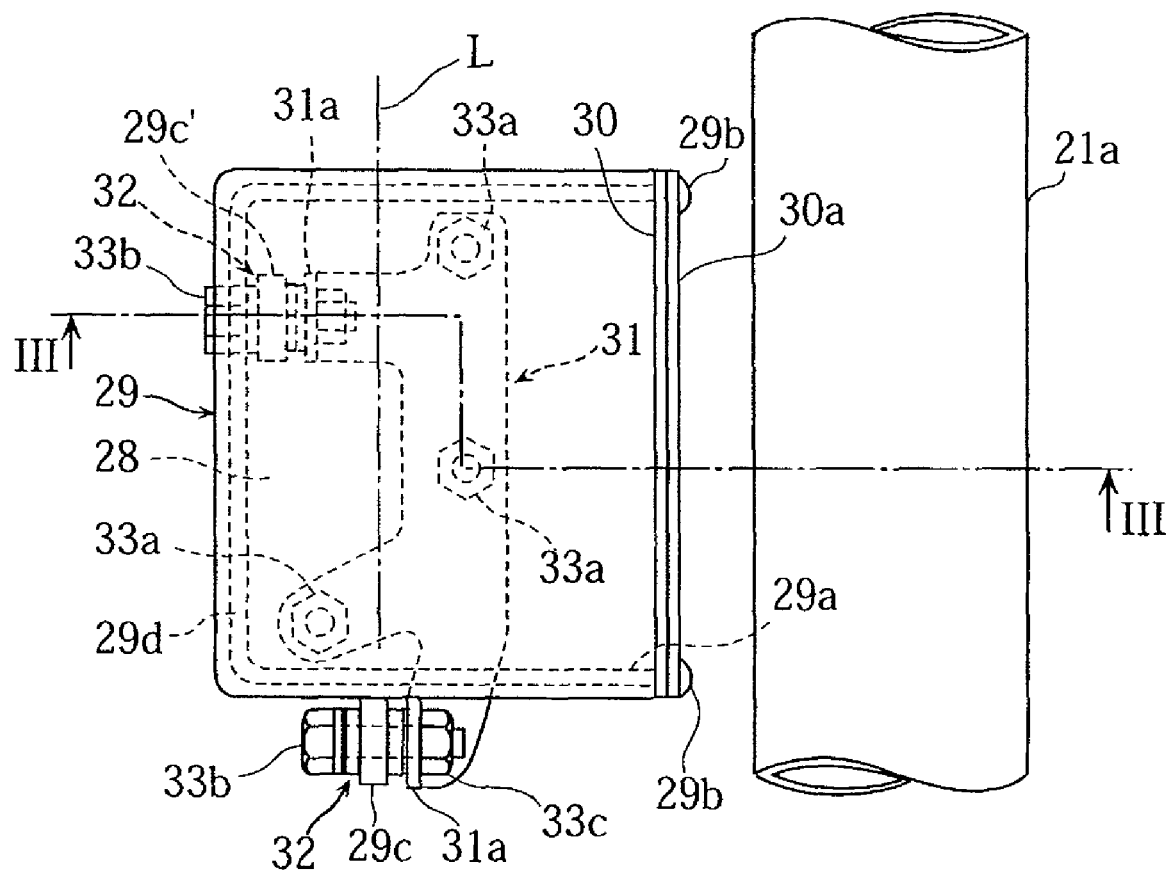
FIG. 4 is a plan view that illustrates the battery mounting arrangement of FIG. 1.

FIGS. 1 to 4 illustrate a motorcycle having certain features, aspects and advantages of one or more preferred embodiments of the invention. Note that, the terms front and rear, and left and right as used herein indicate the front and rear and the left and right as viewed by a rider seated on a seat of the motorcycle. A longitudinal direction is a forward-to-rearward direction relative to a rider seated on a seat of the motorcycle and a lateral direction is a side-to-side direction relative a rider seated on a seat of the motorcycle.

In the figures, reference number 1 refers generally to a motorcycle and, more particularly, to a competition motorcycle, such as the illustrated motorcycle for use in motocross races. An engine 3 is mounted on a body 2 of the motorcycle 1. The body 2 is provided with a frame, which includes a main frame 6 that supports a front fork 4 and a rear swingarm 5. A seat rail 8 and a seat stay 9 of the frame support a seat 7.

The main frame 6 includes a gusset member 6b that has a generally flat plate shape and extends diagonally downward in a rearward direction from a head tube 6a at the front end thereof. A left and a right down tube 23, 23 extend diagonally downward from a lower end section of the gusset member 6b while moving apart from one another outwardly in the vehicle width direction. The down tubes 23 then extend in a rearward direction. Left and right tank rails 12, 12 extend diagonally downward from an upper end section of the gusset member 6b while moving apart from one another outwardly in the vehicle width direction. The tank rails 12, 12 ultimately are joined to a rear end section of the left and right down tubes 23, 23.

The front fork 4 is rotatably supported by the head pipe 6a of the main frame 6 such that the front fork 4 can be steered to the left and right. A front wheel 10 is rotatably supported at a lower end portion of the front fork 4. A steering handle 11 is fixed to an upper end portion of the front fork 4. In addition, a front fender 15 is attached to the front fork 4 such that the front fender 15 extends over a portion of the front wheel 10.

Left and right rear arm brackets 12a, 12a are located at a rear end of the main frame 6, and pivotably support the rear swingarm 5 such that it is capable of swinging relative to the main frame 6 in upward and downward directions. A rear wheel 13 is rotatably supported at a rear end section of the swingarm 5. A rear suspension member (not shown in the figures), such as a shock absorber, is provided between the swingarm 5 and the main frame 6 to attenuate movement of the swingarm 5.

In the illustrated arrangement, the engine 3 is mounted within a cradle formed by the tank rails 12 and the down tubes 23 of the main frame 6. However, in other arrangements, the engine 3 may be otherwise suitably supported by the main frame 6 or the body 2 of the motorcycle 1. The illustrated engine 3 is a 4-stroke, single cylinder, water cooled engine, and has a structure in which a cylinder block 3$c$, a cylinder head 3$d$, and a head cover 3$e$ are supported in that order on a front portion of an upper surface 3$h$ of a crank case 3$b$ that houses a crank shaft 3$a$. The cylinder block 3$c$, a cylinder head 3$d$, and a head cover 3$e$ are joined together with the crank case 3$b$ by a suitable fastening arrangement, such as bolts, for example.

A gear change mechanism (not shown) is provided within the crank case 3$b$ and transmits rotation of the crank shaft 3$a$ to an output shaft 3$f$. The rear wheel 13 is driven to rotate by the output shaft 3$f$ via a chain 16, or other suitable drive arrangement (e.g., shaft or belt drive). In addition, a clutch mechanism housing portion 3$g$ is formed in a right side section of the crank case 3$b$ and houses a clutch mechanism. An upper wall 3$g'$ of the housing portion 3$g$ is formed to bulge upward from the upper surface 3$h$, that is, to bulge toward an exhaust pipe 21$a$, described hereinafter.

A fuel tank 20 is mounted to the main frame 6 above the engine 3, and the seat 7 is provided to the rear side of the fuel tank 20. A fuel cap 20$a$ that can be removed is provided at an upper wall section of the fuel tank 20 to selectively open or close a fuel refill port of the fuel tank 20. In addition, a rear fender 22 that extends over at least a portion of the rear wheel 13 is provided beneath the seat 7 and extends beyond a rearward end of the seat 7.

A left and right radiator 25, 25 maintain the engine coolant at a desirable temperature and are located above and to a forward side of the engine 3. The left and right sides and the rearward portions of the left and right radiators 25 are covered by left and right side covers 27, 27. The left and right side covers 27, 27 function as air scoops that direct air into the left and right radiators 25, 25 and also function as knee grips for the rider.

In addition, an exhaust port is provided in a front wall of the cylinder head 3$d$ of the engine 3. The exhaust pipe 21$a$ of an exhaust device 21 is connected to this exhaust port. The exhaust pipe 21$a$ extends from the engine 3 in a rearward direction on the right side, and in the vicinity of the boundary area of the cylinder block 3$c$ and the cylinder head 3$d$. A muffler 21$b$ is connected to a rear end portion of the exhaust pipe 21$a$. The rear end portion of the exhaust pipe 21$a$ is located in the vicinity, and preferably above, a front edge of the rear wheel 13.

Furthermore, an intake port is provided in a rear wall of the cylinder head 3$d$. An air intake regulating valve controls an amount of air delivered to the combustion chamber of the engine 3 through the intake port. In the illustrated arrangement, the air intake regulating valve is a throttle body 35 connected to the intake port. However, other suitable arrangements may also be used, such as controlling the intake air with the intake valve, for example. A fuel injection device provides fuel to the combustion chamber. In the illustrated arrangement, the fuel injection device is a fuel injection valve 35$a$ disposed in the cylinder head side of the throttle body 35. However, other suitable arrangements for providing fuel to the combustion chamber may also be used, such as a direct injector or carburetor, for example.

A battery 28 that, as illustrated, has a rectangular solid shape is provided towards the central axis L of the motorcycle from the clutch mechanism housing portion 3$g$ between a rear portion of the cylinder block 3$c$, the upper surface 3$h$ of the crank case 3$b$, and the throttle body 35. The battery 28 is housed in a battery case 29 and a heat insulating member 29$d$ is interposed between the battery case 29 and the battery 28. The battery case 29 is positioned slightly downward from and to the inside in the vehicle width direction from the exhaust pipe 21$a$.

The battery case 29 includes a rectangular solid box shape that corresponds with the shape of the battery 28. A cover plate 30 is removable coupled, such as by one or more screws 29$b$, to cover a battery access opening 29$a$ that is formed in the right side of the battery case 29. The cover plate 30 can be attached and removed from the remainder of the battery case 29 to permit access to the battery 28. The cover plate 20 extends upward beyond a remainder of the battery case 29 and passes to the inside of the exhaust pipe 21$a$. Thus, the surface area of the cover plate 30 is larger than a surface area of the side of the battery case 29 portion that the cover plate 30 covers. Moreover, an insulating sheet 30$a$ is attached to the surface of the cover plate 30, preferably on the exhaust pipe 21$a$ side. The cover plate 30 and the insulating sheet 30$a$ are positioned between the exhaust pipe 21$a$ and the battery 28 and function as a heat shield plate that inhibits transmission of heat from the exhaust pipe 21$a$ to the battery 28 side of the heat shield plate. Although the cover plate 30 and insulating sheet 30$a$ illustrated one preferred arrangement of a heat shield, other types and configurations of heat shields may be provided as well. For example, it is not necessary that the heat shield is a cover for the access opening 29$a$ of the battery 28. That is, the heat shield may be a non-removable portion of the battery case 29. Furthermore, the heat shield may be completely separate from the battery case 29 in some arrangements.

The battery case 29 is mounted to the upper surface 3$h$ of the crank case 3$b$ using an attachment bracket, or a support bracket 31, such that the battery case 29 can be attached to and removed from the crank case 3$b$. Preferably, a gap is provided between the battery case 29 and the upper surface 3$h$. As a result, engine heat is inhibited from being transmitted to the battery 28 from the upper surface 3$h$.

The attachment bracket 31 is a plate shaped member and extends in the front-rear direction of the vehicle. The attachment bracket 31 is fitted by one or more bolts 33$a$ to one or more respective bosses 3$i$ that protrude from the upper surface 3$h$ such that the attachment bracket 31 can be attached and removed therefrom. Thus, in the illustrated arrangement, both the battery 28 and the heat shield are supported by the bracket. In other arrangements in which the heat shield does not form a portion of the battery case 29, both the battery 28 and the heat shield may still be supported by the bracket 31. In the illustrated arrangement, at least one boss 3$i$ is provided on each side of the central axis L of the motorcycle 1. Flanges 29$c$, 29$c'$ are formed integrally with a rear wall and a base wall of the battery case 29 are fitted using bolts 33$b$ and nuts 33$c$ to support bosses 31$a$, 31$a'$ formed in a rear end section and a front end section of the attachment bracket 31, with dampers (e.g., elastic members) 32, 32 interposed therebetween. The flanges 29$c$, 29$c'$ are fitted such that they can be attached and removed from the bolts 33$b$ and nuts 33$c$. Note that, in the illustrated arrangement, the nuts 33$c$ are welded to a rear surface of the bosses 31, 31$a'$ to ease assembly.

The illustrated damper 32 is formed from a metal collar 32$a$ with a flange and a rubber grommet 32$b$ that is fitted and mounted to the collar 32$a$. The grommet 32$b$ is fitted to attachment holes of the flange members 29c, 29c', whereby the transmission of vibrations from the engine 3 to the battery 28 is inhibited. In addition, other suitable vibration damping materials may be used in the construction of the grommet 32b, or other suitable mechanisms for attenuating the transmission of vibrations between the engine 3 and the battery 28 may be employed.

In the above described manner, in the illustrated embodiment, the battery 28 is disposed on the upper surface 3h of the crank case 3b and to the rear of the cylinder block 3c. In addition, the cover plate 30 that functions as a heat shield plate is disposed between the battery 28 and the exhaust pipe 21a that is positioned to the side of the battery 28. Accordingly, heat from the exhaust pipe 21a is inhibited from being transmitted to the battery 28, whereby it is possible to inhibit the service life of the battery 28 from being shortened by heat from the exhaust pipe 21a.

In addition, the battery 28 is housed inside the battery case 29, and the cover plate 30 that functions as the heat shield plate is attached to the battery case 29. As a result, the attachment structure of the heat shield plate is simplified, and it is possible to obtain a heat shielding effect without having to provide extra components. Although, as discussed above, in some arrangements it may be desirable to provide the heat shield plate as a separate component from the battery case 29.

In addition, the battery case 29 has the access opening 29a for the battery 28, and the cover plate 30 that is used to selectively cover the opening 29a also functions as the heat shield plate. Accordingly, the heat shielding structure can be simplified still further, if desired.

Moreover, the attachment bracket 31 is attached on the boss 3i that is formed to protrude from the upper surface 3h of the crank case 3b, and the battery case 29 is attached to the bracket 31. As a result, a gap is provided between the battery case 29 and the upper surface of the crank case, whereby engine heat is inhibited from being transmitted to the battery from the crank case.

Furthermore, the heat insulating member 29d is provided between the battery case 29 and the battery 28. As a result, heat from the exhaust pipe 21a and heat from the crank case is inhibited form being transmitted to the battery 28 in this respect as well.

In addition, the damper 32, or other suitable damping arrangement, is interposed between the battery case 29 and the bracket 31, whereby vibration from the engine is inhibited from being transmitted to the battery 28.

The battery case 29 is disposed to the vehicle width direction central axis L side of the clutch mechanism housing portion 3g. As a result, the battery 28 can be disposed without any interference with the clutch mechanism housing portion 3g that protrudes upward.

In addition, the battery case 29 is disposed between the upper surface 3h of the crank case and the throttle body 35 disposed to the upper side of the upper surface 3h. Accordingly, the space formed by the upper surface 3h of the crank case and the throttle body 35 can be beneficially used to dispose the battery 28. Note that, in the case that a standard carburetor is used that has a float chamber, the above-described space will become narrower by an amount corresponding to the size of the float chamber, which makes it difficult to ensure space for disposing the battery.

Note that, the above-described embodiment explained an example of a competition motorcycle, such as a motorcycle for use in motocross races. However, as will be readily apparent, certain features, aspects and advantages of the disclosed mounting arrangement may be applied to other types of motorcycles, such as those intended for recreational off-road or on-road use.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present motorcycle with battery mounting arrangement has been described in the context of particularly preferred embodiments, the skilled artisan will appreciate, in view of the present disclosure, that certain advantages, features and aspects of the arrangement may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A motorcycle, comprising:
    a frame;
    an engine supported by the frame, the engine comprising a crank case and a cylinder block supported on a forward portion of the crank case;
    an exhaust pipe coupled to the engine and having a portion that extends along a side of the engine;
    a battery located above an upper surface of the crank case of the engine and to the rear of the cylinder block; and
    a heat shield plate including an insulating sheet that inhibits transmission of heat positioned between the exhaust pipe and the battery; wherein
    the exhaust pipe and at least a portion of the heat shield plate overlap each other when viewed from a side of the motorcycle.

2. The motorcycle of claim 1, further comprising a battery case that houses the battery, wherein the heat shield plate forms a portion of the battery case.

3. The motorcycle of claim 1, further comprising a bracket provided on the upper surface of the crank case, wherein the battery is removably coupled to the bracket.

4. The motorcycle of claim 1, wherein the battery is positioned below the exhaust pipe when viewed from the side of the motorcycle.

5. The motorcycle of claim 1, further comprising a clutch mechanism housing portion formed in the crank case, wherein the clutch mechanism housing portion extends towards the exhaust pipe relative to the upper surface of the crank case and is positioned beneath the exhaust pipe in a lateral direction of the motorcycle, and the battery is positioned towards a central axis of the motorcycle relative to the clutch mechanism housing portion.

6. The motorcycle of claim 1, further comprising an intake air regulation valve that is coupled to a rear wall of a cylinder head of the engine, wherein the battery is positioned between the upper surface of the crank case and the throttle body.

7. The motorcycle of claim 2, wherein the battery case includes an access opening to permit access to the battery, and the heat shield plate is connectable to the battery case to selectively cover the access opening.

8. The motorcycle of claim 2, further comprising at least one mounting boss that protrudes from the upper surface of the crank case, wherein the battery case is coupled to the at least one mounting boss.

9. The motorcycle of claim 2, further comprising a heat insulating member positioned between the battery case and the battery.

10. The motorcycle of claim 7, wherein the heat shield plate extends above a remainder of the battery case to which the heat shield plate is connectable.

11. The motorcycle of claim 3, further comprising a battery case that houses the battery, wherein the battery case is removably coupled to the bracket.

12. The motorcycle of claim 11, further comprising an elastic member interposed between the battery case and the bracket.

13. The motorcycle of claim 8, wherein the at least one mounting boss comprises a plurality of mounting bosses, with at least one of the plurality of mounting bosses positioned on each side of a central longitudinal axis of the motorcycle.

14. The motorcycle of claim 8, further comprising a bracket provided on the upper surface of the crank case that supports the battery, wherein the at least one mounting boss is located below the battery when the battery is supported by the bracket.

15. A motorcycle, comprising:
a body;
an engine supported relative to the body, the engine comprising a crank case and a cylinder block supported by the crank case;
a battery located above the crank case and rearward of the cylinder block;
an exhaust pipe communicating with the engine and having a portion that extends along a side of the engine; and
a heat shield that inhibits the transmission of heat produced by the exhaust pipe to the battery; wherein
the exhaust pipe and at least a portion of the heat shield overlap each other when viewed from a side of the motorcycle.

16. The motorcycle of claim 15, wherein the heat shield is supported by a bracket that also supports the battery.

17. The motorcycle of claim 15, wherein the heat shield defines a portion of a case that houses the battery.

18. The motorcycle of claim 15, wherein the battery is positioned below the exhaust pipe when viewed from a side of the motorcycle.

19. The motorcycle of claim 15, wherein the heat shield includes an insulating sheet arranged between the exhaust pipe and a cover plate of a battery case housing the battery, the cover plate arranged to cover an access opening to the battery case.

20. The motorcycle of claim 15, wherein the battery and the exhaust pipe are spaced from each other when viewed from the side of the motorcycle, and the heat shield is arranged to at least partially overlap both of the battery and the exhaust pipe when viewed from the side of the motorcycle.

21. The motorcycle of claim 16, wherein the bracket is coupled to at least one mounting boss formed by the crank case of the engine.

22. The motorcycle of claim 21, wherein the at least one mounting boss comprises a plurality of mounting bosses, with at least one of the plurality of mounting bosses positioned on each side of a central longitudinal axis of the motorcycle.

23. The motorcycle of claim 20, wherein the heat shield includes an insulating sheet that inhibits transmission of heat, and the insulating sheet is arranged to at least partially overlap both of the battery and the exhaust pipe when viewed from the side of the motorcycle.

24. The motorcycle of claim 23, further comprising a battery case that houses the battery, wherein the heat shield defines a portion of the battery case.

* * * * *